United States Patent
Ogawa et al.

(10) Patent No.: US 10,804,019 B2
(45) Date of Patent: Oct. 13, 2020

(54) ELECTROMAGNETIC ACTUATOR

(71) Applicant: Mitsubishi Electric Corporation, Tokyo (JP)

(72) Inventors: Toru Ogawa, Tokyo (JP); Tomoya Uchimura, Tokyo (JP); Shoji Ishikawa, Tokyo (JP); Hitoshi Yoshizumi, Tokyo (JP); Satoshi Tesen, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 108 days.

(21) Appl. No.: 16/307,300

(22) PCT Filed: Jul. 12, 2016

(86) PCT No.: PCT/JP2016/070548
§ 371 (c)(1),
(2) Date: Dec. 5, 2018

(87) PCT Pub. No.: WO2018/011883
PCT Pub. Date: Jan. 18, 2018

(65) Prior Publication Data
US 2019/0139689 A1 May 9, 2019

(51) Int. Cl.
*H01F 7/16* (2006.01)
*F16K 31/08* (2006.01)
*H01F 7/122* (2006.01)
*H01H 50/20* (2006.01)

(52) U.S. Cl.
CPC ............ *H01F 7/16* (2013.01); *F16K 31/082* (2013.01); *H01F 7/122* (2013.01); *H01H 50/20* (2013.01)

(58) Field of Classification Search
CPC .. H01F 7/16–7/1615; H01F 2007/1684; H01F 2007/185
See application file for complete search history.

(56) References Cited

U.S. PATENT DOCUMENTS

| | | |
|---|---|---|
| 5,032,812 A | 7/1991 | Banick et al. |
| 2013/0113582 A1 | 5/2013 | Schiepp et al. |
| 2016/0071640 A1 | 3/2016 | Kato |
| 2018/0172478 A1 | 6/2018 | Sugawara et al. |

FOREIGN PATENT DOCUMENTS

| | | |
|---|---|---|
| DE | 202010010371 U1 | 12/2011 |
| DE | 102015111385 A1 | 3/2016 |
| JP | 7-94322 A | 4/1995 |
| WO | WO 2011/042273 A1 | 4/2011 |
| WO | WO 2016/194207 A1 | 12/2016 |

*Primary Examiner* — Ramon M Barrera
(74) *Attorney, Agent, or Firm* — Birch, Stewart, Kolasch & Birch, LLP (57) ABSTRACT

A sensor core (8) is arranged in a plane (P1), which is positioned on sides of opposite ends of plungers (5a, 5b) from bosses (6a, 6b), and which is perpendicular to a direction of movement of the plungers (5a, 5b). A magnetic sensor (9) is arranged at a position in the plane (P1), the position being apart from a magnetic path (A3) of a leakage flux of a magnetic circuit (A).

12 Claims, 10 Drawing Sheets

ELECTROMAGNETIC ACTUATOR

TECHNICAL FIELD

The present invention relates to an electromagnetic actuator having a function of detecting the position of a plunger.

BACKGROUND ART

For example, an electromagnetic actuator described in Patent Literature 1 includes a coil, a yoke, a plug nut, a core, a spring, a first magnet, a second magnet, and a magnetic sensor.

The coil generates a magnetomotive force through the passage of a current therethrough. The yoke is a member disposed in such a way as to surround the coil. The plug nut is fixed to an end of the coil on a central axis. The core is disposed in the coil coaxially to the plug nut, and moves between a position where the core is engaged with the plug nut, and a position where the core is apart from the plug nut. Further, the spring is disposed between the plug nut and the core, and energizes the core toward a direction in which the core is far away from the plug nut.

The first and second magnets are used for the detection of the position of the core. The first magnet is larger than the second magnet, and is in a state in which the first magnet is sandwiched between parts of the yoke on a side of the axis line of the coil. Further, the second magnet is in a state in which the second magnet is sandwiched between parts of the yoke on another side of the axis line of the coil. The magnetic sensor detects the magnetic flux density changing dependently on the position of the core, and is disposed on a side of the second magnet.

The core in an initial state in which there is no passage of a current through the coil is held at a position where the core is apart from the plug nut because of the energizing force of the spring. At this time, the magnetic flux from the first magnet is dominant in the magnetic flux detected by the magnetic sensor. When an electromagnetic force in an axis direction acts in the core because of the passage of a current through the coil, the core moves toward the plug nut and is engaged with the plug nut. In a state in which the core and the plug nut are engaged with each other, the magnetic flux from the second magnet is dominant in the magnetic flux detected by the magnetic sensor.

Because the first and second magnets are arranged on the respective sides of the axis line of the coil in such a way that the directions of their respective magnetic fluxes are opposite to each other, the position of the core is detected from the direction of the magnetic flux.

Hereafter, the core mentioned above is called a plunger.

CITATION LIST

Patent Literature

Patent Literature 1: Japanese Unexamined Patent Application Publication No. Hei 7-94322

SUMMARY OF INVENTION

Technical Problem

However, in the electromagnetic actuator described in Patent Literature 1, two magnets are needed in order to detect the position of one plunger, and, further, the positions of multiple plungers cannot be detected by using one magnetic sensor.

Therefore, in a case in which the structure described in Patent Literature 1 is used in an electromagnetic actuator including multiple plungers, magnets whose number is twice the number of plungers are needed, and multiple magnetic sensors are needed. Therefore, a problem is that the number of parts increases, and thus the actuator itself enlarges in size.

The present invention is made in order to solve the above-mentioned problem, and it is therefore an object of the present invention to provide an electromagnetic actuator that can reduce the number of parts and suppress upsizing even though the electromagnetic actuator includes multiple plungers.

Solution to Problem

An electromagnetic actuator according to the present invention includes multiple solenoid units and a magnetic sensor circuit. Each of the solenoid units includes: a case which is a magnetic body; a core provided in the case, the core being a magnetic body; a boss provided for the case and facing the core in an axis direction of the core, the boss being a magnetic body; a coil provided around an outer periphery of the core; and a plunger. The plunger is provided along an inner periphery of the core and moves by receiving a magnetic attraction force in the axis direction, the magnetic attraction force acting between the plunger and the boss by a magnetic flux generated by passage of a current through the coil. The magnetic sensor circuit includes: a sensor magnet provided for each of the solenoid units; a sensor core through which a magnetic flux of the sensor magnet flows, the sensor core being a magnetic body; and a single magnetic sensor to detect a magnetic flux flowing through the sensor core and changing dependently on a position of the plunger.

In this structure, the sensor core is arranged in a plane which is positioned on a side of an opposite end of the plunger from the boss and which is perpendicular to a direction of movement of the plunger, and the magnetic sensor is arranged at a position in the plane, the position being apart from a magnetic path of a leakage flux which is generated by the passage of a current through the coil and flows through the sensor core.

Advantageous Effects of Invention

According to the present invention, because the sensor core is arranged in the plane which is positioned on the side of the opposite end of the plunger from the boss and which is perpendicular to the direction of movement of the plunger, the magnetic flux of the sensor magnet circulates in the sensor core. In addition, because the magnetic sensor is arranged at the position in the plane, the position being apart from the magnetic path of the leakage flux which is generated by the passage of a current through the coil and flows through the sensor core, the influence of the leakage flux generated by the passage of a current through the coil can be reduced. As a result, because even though multiple plungers are included, the positions of the multiple plungers can be detected by using the single magnetic sensor, the number of parts can be reduced and upsizing can be suppressed.

DESCRIPTION OF EMBODIMENTS

Hereafter, in order to explain this invention in greater detail, embodiments of the present invention will be described with reference to the accompanying drawings.

Embodiment 1

Figure 1:
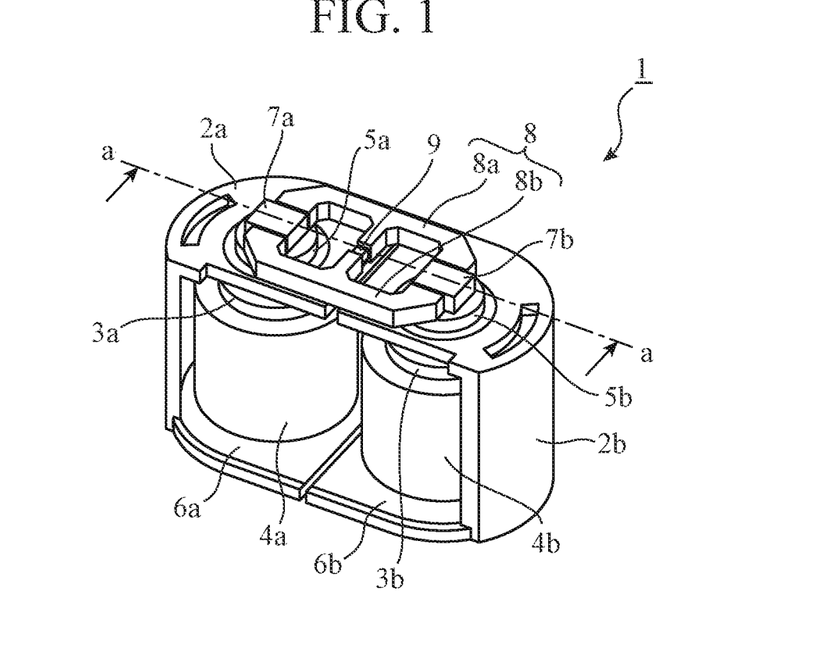
FIG. 1 is a perspective view showing an electromagnetic actuator according to Embodiment 1 of the present invention.
Figure 2:
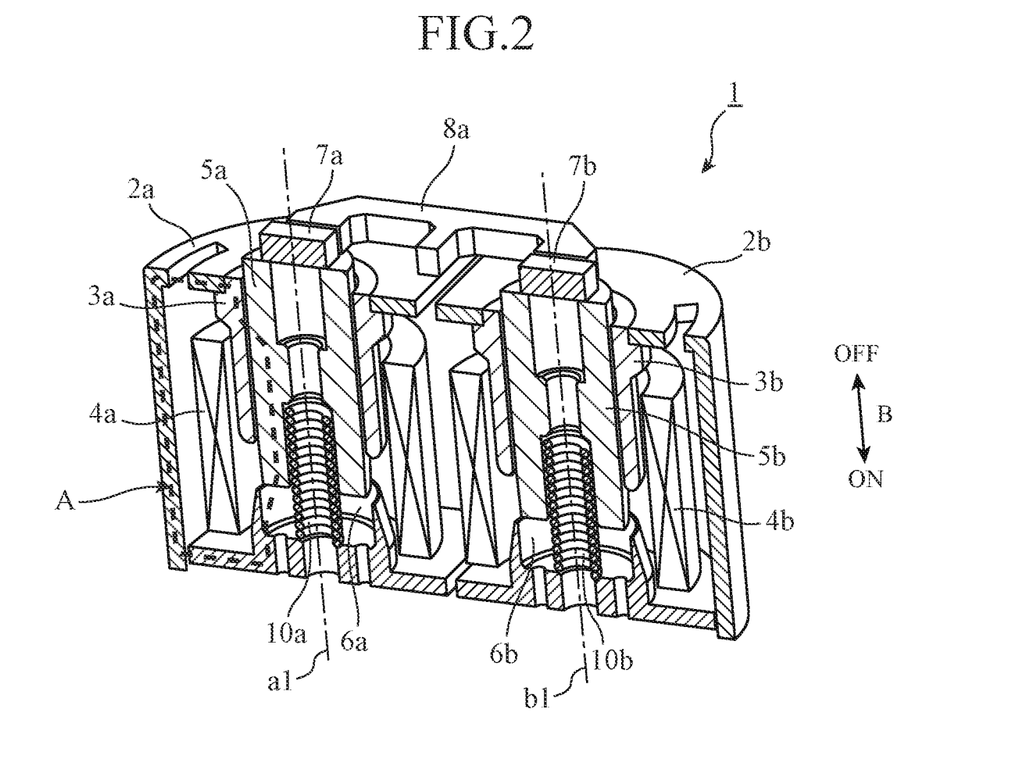
FIG. 2 is a cross-sectional perspective view showing a state in which the electromagnetic actuator according to Embodiment 1 is taken along line a-a of FIG. 1.

FIG. 1 is a perspective view showing an electromagnetic actuator 1 according to Embodiment 1 of the present invention. FIG. 2 is a cross-sectional perspective view showing a state in which the electromagnetic actuator 1 is taken along line a-a of FIG. 1.

The electromagnetic actuator 1 is configured so as to include two solenoid units arranged adjacent to each other, and a magnetic sensor circuit arranged above the solenoid units. One of these solenoid units includes a case 2a, a core 3a, a coil 4a, a plunger 5a, a boss 6a, and a spring 10a, and the other solenoid unit includes a case 2b, a core 3b, a coil 4b, a plunger 5b, a boss 6b, and a spring 10b. Further, the magnetic sensor circuit is configured so as to include sensor magnets 7a and 7b, a sensor core 8, and a magnetic sensor 9.

The cases 2a and 2b are formed of magnetic bodies, and have holes through which upper ends of the cores 3a and 3b and upper ends of the plungers 5a and 5b pass, as shown in FIG. 2. The plungers 5a and 5b move along the axes a1 and b1 of these holes. The cores 3a and 3b are tubular members in which the plungers 5a and 5b are arranged along the inner peripheries thereof, and are formed of magnetic bodies, like the cases 2a and 2b. The coils 4a and 4b are magnet coils wound on not-illustrated bobbins disposed around the outer peripheries of the cores 3a and 3b.

The plungers 5a and 5b are tubular members formed of magnetic bodies. Further, the bosses 6a and 6b are members provided for the cases 2a and 2b and facing the cores 3a and 3b in directions of the axes a1 and b1, and are formed of magnetic bodies.

The springs 10a and 10b are coil springs disposed between the plungers 5a and 5b and the bosses 6a and 6b, as shown in FIG. 2, the coil springs being nonmagnetic bodies. In a state which no currents are passed through the coils 4a and 4b, the plungers 5a and 5b are energized by the springs 10a and 10b toward an OFF direction of an arrow B, i.e., a direction in which the plungers are far away from the bosses 6a and 6b.

For example, when a current is passed through only the coil 4a, a magnetic circuit A for thrust generation in which a magnetic flux occurring in the coil 4a flows from the core 3a to the plunger 5a, the boss 6a, the case 2a, and the core 3a in this order is formed. By means of this magnetic circuit A, a magnetic attraction force in an axis direction is generated between the plunger 5a and the boss 6a. As a result, the plunger 5a moves toward an ON direction of the arrow B, i.e., toward the boss 6a, and is held at a lower end position of a movable range of the plunger 5a.

Any of the following three states can be expected as the operating state of the solenoid units.

There are a state in which no currents are passed through both the coils 4a and 4b (referred to as OFF/OFF hereafter), a state in which a current is passed through one of the coils (referred to as ON/OFF or OFF/ON hereafter), and a state in which currents are passed through both the coils (referred to as ON/ON hereafter).

In the OFF/OFF state, both the plungers 5a and 5b receive only the energizing forces from the springs 10a and 10b. As a result, the plungers 5a and 5b are held at positions where the upper ends thereof are close to the sensor magnets 7a and 7b, i.e., upper end positions of the movable ranges thereof. FIG. 2 shows the OFF/OFF state.

In the ON/OFF or OFF/ON state, one of the plungers 5a and 5b is held at the upper end position of the movable range thereof, and the other one of them is held at the lower end position of the movable range thereof.

In the ON/ON state, both the plungers 5a and 5b are held at the lower end positions of the movable ranges thereof by the magnetic fluxes generated by the passage of currents to the coils 4a and 4b.

In the electromagnetic actuator 1, any of these three states is determined and thus the positions of the plungers 5a and 5b are detected.

Figure 3:
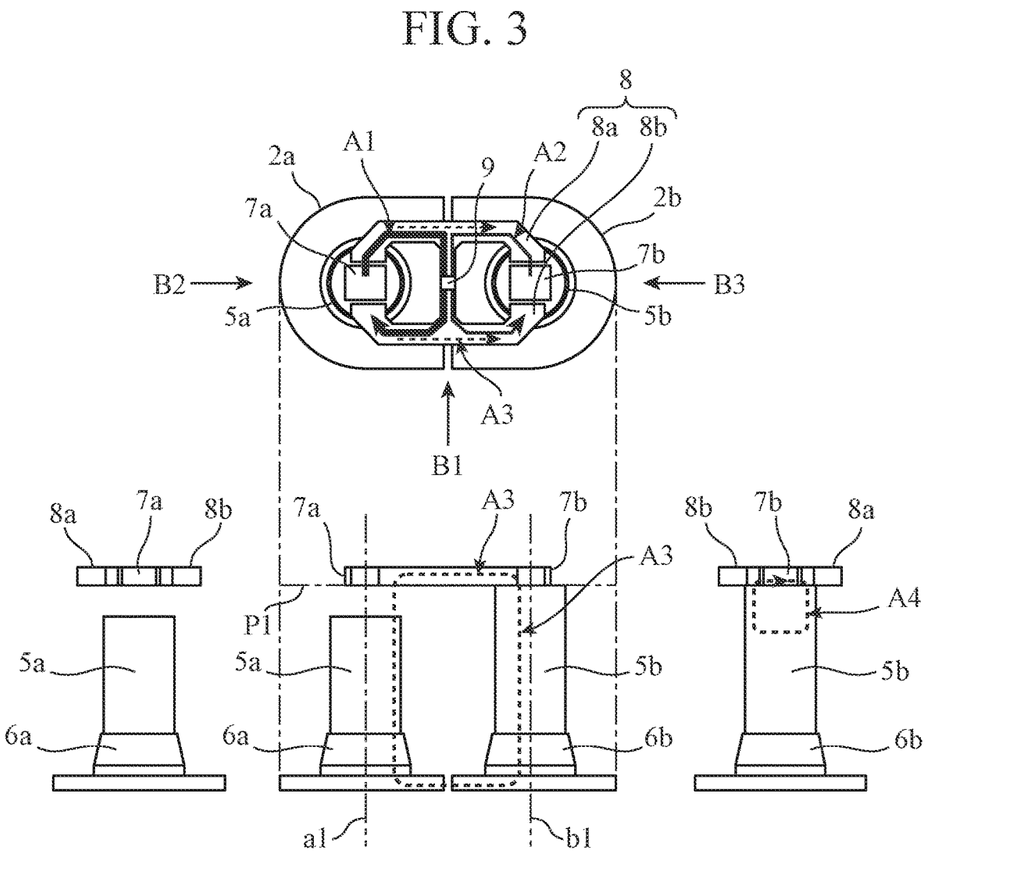
FIG. 3 is a diagram showing a magnetic sensor circuit in the electromagnetic actuator according to Embodiment 1.

FIG. 3 is a diagram showing the magnetic sensor circuit in the electromagnetic actuator 1. A top view of the electromagnetic actuator 1 is illustrated in an upper part of FIG. 3. Further, a state in which the magnetic sensor circuit, the plungers 5a and 5b, and the bosses 6a and 6b in the electromagnetic actuator 1 are viewed from a direction B1 is illustrated in the center of a lower part, a state in which they are viewed from a direction B2 is illustrated on a left side of the lower part, and a state in which they are viewed from a direction B3 is illustrated on a right side of the lower part.

The sensor magnets 7a and 7b are prismatic permanent magnets arranged on upper sides of the plungers 5a and 5b, i.e., on sides of opposite ends of the plungers from the bosses 6a and 6b, as shown in FIG. 3.

The sensor core 8 includes a first sensor core unit 8a and a second sensor core unit 8b, and is arranged in a plane P1, which is positioned on the sides of the opposite ends of the plungers 5a and 5b from the bosses 6a and 6b, and which is perpendicular to the direction of movement of the plungers 5a and 5b.

The first sensor core unit 8a is a member approximately shaped like a letter M in which two outer legs and one inner leg extend in the same direction from a rod-shaped member which is a base, as shown in FIGS. 1 and 3, and is formed of a magnetic body. The second sensor core unit 8b is similarly a member approximately shaped like a letter M and having two outer legs and one inner leg, and is formed of a magnetic body.

The first sensor core unit 8a and the second sensor core unit 8b are arranged in such a way that their outer legs in each pair are made to face each other with each of the sensor magnets 7a and 7b being sandwiched between the outer legs facing each other in the corresponding pair, and their the inner legs are made to face each other with the magnetic sensor 9 being sandwiched between the inner legs. Each of the first sensor core unit 8a and the second sensor core unit 8b is formed in such a way as to be bilaterally symmetric with respect to the corresponding inner leg as a boundary, and in each of the sensor core units, the distance between one of the outer legs and the inner leg is substantially the same as the distance between the other one of the outer legs and the inner leg.

Further, in the electromagnetic actuator 1 according to Embodiment 1, the sensor magnets 7a and 7b are fixed to the sensor core 8 on the sides of the opposite ends of the plungers 5a and 5b from the bosses 6a and 6b. For example, the sensor magnets 7a and 7b can be formed integrally between the outer legs of the first sensor core unit 8a and the outer legs of the second sensor core unit 8b by using a resin.

By fixing and arranging the sensor magnets 7a and 7b between the outer legs, positioning at a time of attachment to the plungers 5a and 5b is unnecessary, and thus the assembly of the electromagnetic actuator 1 is easy. In addition, because the sensor magnets 7a and 7b are not attached to the plungers 5a and 5b, the plunger 5a and the 5b themselves come down in weight, and thus the responsivity is improved.

Further, because the sensor magnets 7a and 7b do not move together with the plungers 5a and 5b, the reliability is improved.

The magnetic sensor 9 detects the magnetic flux flowing through the sensor core 8 and changing dependently on the positions of the plungers 5a and 5b. Further, the magnetic sensor 9 is a single sensor disposed between the inner leg of the first sensor core unit 8a, and the inner leg of the second sensor core unit 8b.

The first sensor core unit 8a and the second sensor core unit 8b can be members each of which is formed of a laminated steel plate. In this case, because what is necessary is just to punch a laminated steel plate to be a shape of approximately a letter M, the machining is performed easily compared with the shaving of a metallic material, and the manufacturing cost can be reduced.

The operating state of the solenoid units shown in FIG. 3 is ON/OFF, and the plunger 5a is at the lower end position of the movable range thereof and the plunger 5b is at the upper end position of the movable range thereof. In this operating state, as shown in the upper part of FIG. 3, a magnetic circuit A1 in which the sensor magnet 7a is a magnetomotive force source and a magnetic circuit A2 in which the sensor magnet 7b is a magnetomotive force source are formed in the sensor core 8.

As mentioned above, the sensor core 8 is arranged in the plane P1, which is positioned on the sides of the opposite ends of the plungers 5a and 5b from the bosses 6a and 6b, and which is perpendicular to the direction of movement of the plungers 5a and 5b. Therefore, the magnetic fluxes from the sensor magnets 7a and 7b flow in directions perpendicular to the direction of movement of the plungers 5a and 5b.

In FIG. 3, the plunger 5b is at the upper end position of the movable range thereof, and the upper end of the plunger 5b is close to the sensor magnet 7b. As a result, there occurs a so-called short circuit in which the magnetic flux generated by the sensor magnet 7b passes through a magnetic path A4 and flows through the plunger 5b, so that the amount of the magnetic flux flowing through the magnetic circuit A2 is small.

On the other hand, the plunger 5a is at the lower end position of the movable range thereof, and the gap between the upper end of the plunger 5a and the sensor magnet 7a is large and thus the magnetic resistance is large. As a result, it is difficult for the magnetic flux generated by the sensor magnet 7a to be short-circuited to the plunger 5a, so that the amount of the magnetic flux flowing through the magnetic circuit A1 is not small.

Figure 4:
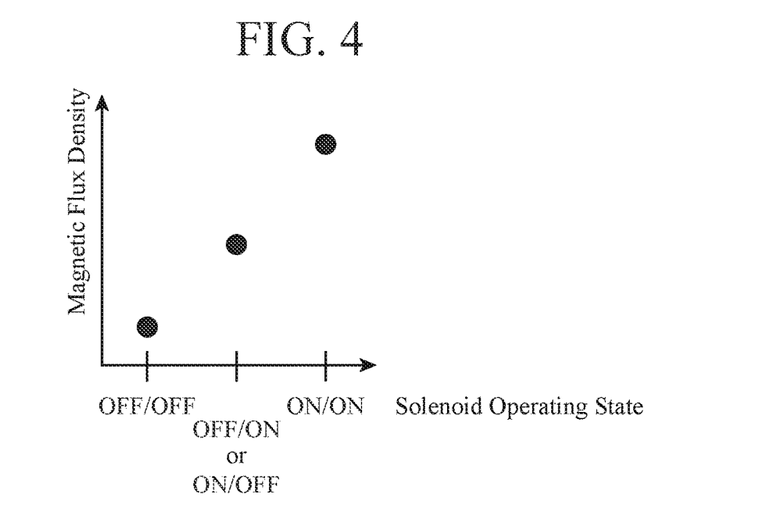
FIG. 4 is a graph showing a relation between the operating state of solenoid units in Embodiment 1, and a magnetic flux density at a point where a magnetic sensor exists.

FIG. 4 is a graph showing a relation between the operating state of the solenoid units in Embodiment 1, and a magnetic flux density at a point where the magnetic sensor 9 exists. As shown in FIG. 4, when the operating state of the solenoid units is the ON/ON state, the magnetic flux density at the point where the magnetic sensor 9 exists has the highest value. In the OFF/ON or ON/OFF state, the magnetic flux density at the point where the magnetic sensor 9 exists has an intermediate value. In the OFF/OFF state, the magnetic flux density at the point where the magnetic sensor 9 exists has the lowest value.

In this way, in the electromagnetic actuator 1, the magnetic fluxes from the sensor magnets 7a and 7b change dependently on the positions of the plungers 5a and 5b. Therefore, by detecting the change in the magnetic flux density by using the magnetic sensor 9, the operating state of the solenoid units can be determined and thus the positions of the plungers 5a and 5b can be detected.

The facing area between the inner leg of the first sensor core unit 8a and the inner leg of the second sensor core unit 8b can be made to be smaller than the facing area between their outer legs in each pair as shown in FIG. 3 in such a way that the magnetic fluxes of the sensor magnets 7a and 7b flowing through the magnetic sensor 9 increase. As a result, the magnetic fluxes from the sensor magnets 7a and 7b flow through the magnetic sensor 9 concentratedly. Therefore, the density of the magnetic flux flowing through the magnetic sensor 9 is high, and thus the difference in the magnetic flux density dependent on the difference between the positions of the plungers 5a and 5b is large. As a result, the difference in the magnetic flux density can be easily detected by the magnetic sensor 9.

Further, while the magnetic fluxes from the sensor magnets 7a and 7b flow through the sensor core 8 because the magnetic sensor circuit in Embodiment 1 is arranged in the above-mentioned plane P1, a leakage flux of the magnetic circuit A shown in FIG. 2 also flows through the sensor core 8.

However, the leakage flux of the magnetic circuit A flows through a magnetic path A3 denoted by broken lines in the upper part of FIG. 3 and a broken line in the center of the lower part of FIG. 3. More specifically, the leakage flux of the magnetic circuit A flows through the thick bases of the first sensor core unit 8a and the second sensor core unit 8b, but does not flow through the inner legs.

In view of this fact, the magnetic sensor 9 is arranged at a position where the inner legs of the sensor core 8 face each other, i.e., a position in the plane P1, the position being apart from the magnetic path A3 of the leakage flux of the magnetic circuit A.

As a result, because the amount of the leakage flux of the magnetic circuit A passing through the magnetic sensor 9 is sufficiently smaller than the amounts of the magnetic fluxes of the sensor magnets 7a and 7b passing through the magnetic sensor 9, erroneous detection of the operating state of the solenoid units is reduced.

Figure 5:
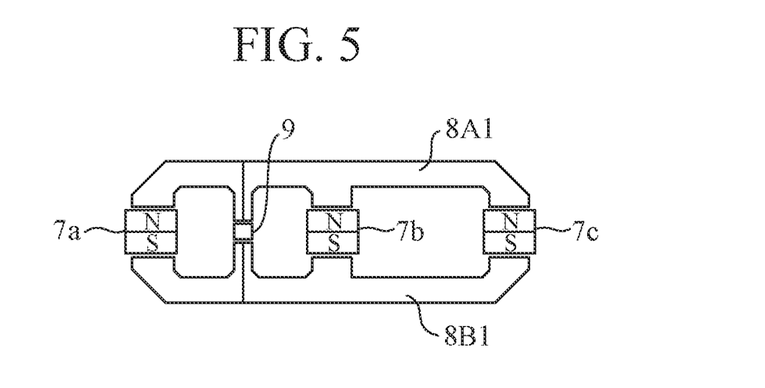
FIG. 5 is a diagram showing a variant of the magnetic sensor circuit in Embodiment 1.

FIG. 5 is a diagram showing a variant of the magnetic sensor circuit in Embodiment 1, and shows a magnetic sensor circuit in the electromagnetic actuator 1 including three solenoid units.

A first sensor core unit 8A1 is a member in which four legs extend in the same direction from a rod-shaped member which is a base, as shown in FIG. 5, and is formed of a magnetic body. A second sensor core unit 8B1 is similarly a member having four legs, and is formed of a magnetic body.

The first sensor core unit 8A1 is arranged with respect to the second sensor core unit 8B1 in such a way that one of the four legs of the first sensor core unit is made to face corresponding one of the four legs of the second sensor core unit with a magnetic sensor 9 being sandwiched between the legs facing each other, and the remaining legs of the first sensor core unit are made to face the corresponding remaining legs of the second sensor core unit with each of the sensor magnets 7a, 7b, and 7c being sandwiched between the remaining legs facing each other in the corresponding pair.

This magnetic sensor circuit is arranged in a plane P1 perpendicular to a direction of movement of the plungers of the three solenoid units, and the magnetic sensor 9 is arranged at a position apart from the magnetic path of a leakage flux of a magnetic circuit A in the plane P1.

Figure 6:
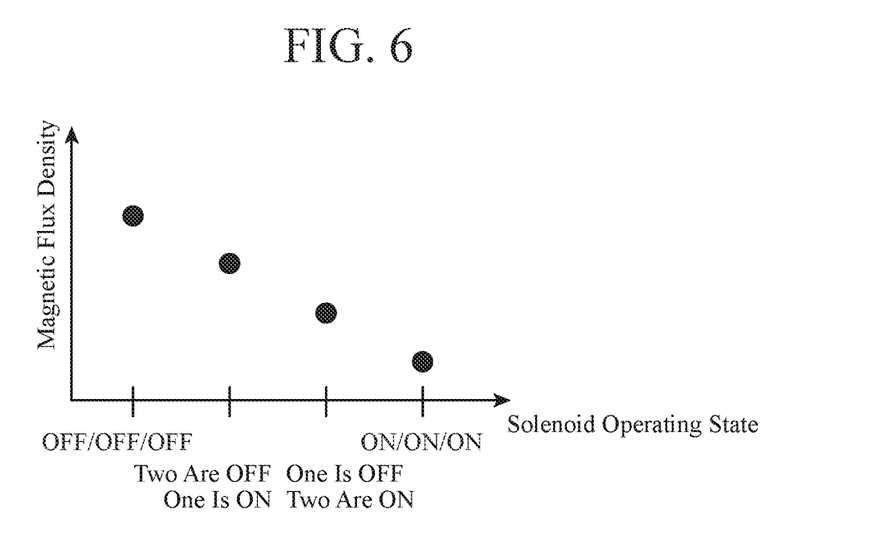
FIG. 6 is a graph showing a relation between the operating state of solenoid units in the electromagnetic actuator including the magnetic sensor circuit of FIG. 5, and a magnetic flux density at a point where a magnetic sensor exists.

FIG. 6 is a graph showing a relation between the operating state of the solenoid units in the electromagnetic actuator including the magnetic sensor circuit of FIG. 5, and the magnetic flux density at the point where the magnetic sensor exists.

As shown in FIG. 6, when the operating state of the solenoid units is OFF/OFF/OFF, the magnetic flux density at the point where the magnetic sensor 9 exists has the highest value. In a state in which two of the solenoid units are OFF and the other one of them is ON, the magnetic flux density at the point where the magnetic sensor 9 exists has the second highest value. In a state in which one of the solenoid units is OFF and the other two of them are ON, the magnetic flux density at the point where the magnetic sensor 9 exists has the third highest value. In an ON/ON/ON state, the magnetic flux density at the point where the magnetic sensor 9 exists has the lowest value. FIG. 5 shows the case in which the operating state of the three solenoid units is ON/ON/ON.

The magnetic fluxes from the sensor magnets 7a, 7b, and 7c change dependently on the operating state of the three solenoid units. Therefore, by detecting the change in the magnetic flux density by using the magnetic sensor 9, the operating state of the solenoid units can be determined and thus the positions of the plungers can be detected.

In this way, the electromagnetic actuator 1 according to Embodiment 1 can be configured so as to include three or more solenoid units. In this case, the sensor core of the magnetic sensor circuit includes first and second sensor core units each of which has three or more legs as mentioned above. The second sensor core unit is arranged with respect to the first sensor core unit in such a way that one of the three or more legs of the second sensor core unit is made to face corresponding one of the three or more legs of the first sensor core unit with the magnetic sensor being sandwiched between the legs facing each other, and the remaining legs of the second sensor core unit are made to face the corresponding remaining legs of the first sensor core unit with each of the sensor magnets being sandwiched between the remaining legs facing each other in the corresponding pair. By configuring in this way, the positions of the three or more plungers can be detected from the magnetic flux density detected by the magnetic sensor 9.

Further, although the case in which the magnetic sensor 9 is arranged at the position where the inner legs of the sensor core 8 face each other is shown, it is not limited to this case.

More specifically, in Embodiment 1, what is necessary is just to arrange the magnetic sensor 9 at a position in the plane P1, the position being apart from the magnetic path A3 of the leakage flux of the magnetic circuit A.

As mentioned above, in the electromagnetic actuator 1 according to Embodiment 1, the sensor core 8 is arranged in the plane P1, which is positioned on sides of the opposite ends of the plungers 5a and 5b from the bosses 6a and 6b, and which is perpendicular to the direction of movement of the plungers 5a and 5b. As a result, the magnetic fluxes of the sensor magnets 7a and 7b circulate in the sensor core 8. In addition, because the magnetic sensor 9 is arranged at a position in the plane P1, the position being apart from the magnetic path A3 of the leakage flux of the magnetic circuit A, the influence of leakage fluxes generated by the passage of currents to the coils 4a and 4b can be reduced. By configuring in this way, because the positions of the plungers can be detected by using the single magnetic sensor 9 even though the multiple plungers are included, the number of parts can be reduced and upsizing can be suppressed.

Further, in the electromagnetic actuator 1 according to Embodiment 1, the sensor magnets 7a and 7b are fixed to the sensor core 8 on sides of the opposite ends of the plungers 5a and 5b from the bosses 6a and 6b. By configuring in this way, the positioning at a time of attachment to the plungers 5a and 5b is unnecessary, and thus the assembly of the electromagnetic actuator 1 is easy.

In addition, in the electromagnetic actuator 1 according to Embodiment 1, the sensor core 8 includes the first sensor core unit 8a having two outer legs and one inner leg, and the second sensor core unit 8b having two outer legs and one inner leg. The first sensor core unit 8a and the second sensor core unit 8b are arranged in such a way that their outer legs in each pair are made to face each other with each of the sensor magnets 7a and 7b being sandwiched between the outer legs facing each other in the corresponding pair, and their inner legs are made to face each other with the magnetic sensor 9 being sandwiched between the inner legs. By configuring in this way, the magnetic fluxes of the sensor magnets 7a and 7b circulate in the sensor core 8. Further, the inner legs face each other at a position in the plane P1, the position being apart from the magnetic path A3 of the leakage flux of the magnetic circuit A.

In addition, in the electromagnetic actuator 1 according to Embodiment 1, the facing area between the inner legs of the first sensor core unit 8a and the second sensor core unit 8b can be made to be smaller than the facing area between their outer legs in each pair. By configuring in this way, the magnetic fluxes from the sensor magnets 7a and 7b flow concentratedly, and thus the density of the magnetic flux flowing through the magnetic sensor 9 is high. As a result, because the difference in the magnetic flux density dependent on the difference between the positions of the plungers 5a and 5b is large, the difference in the magnetic flux density can be easily detected by the magnetic sensor 9.

In addition, in the electromagnetic actuator 1 according to Embodiment 1, the sensor core 8 is formed of a laminated steel plate. As a result, because what is necessary is just to punch a laminated steel plate to be the shape of each of the sensor core units, the machining is performed easily compared with the shaving of a metallic material. Therefore, the manufacturing cost can be reduced.

Embodiment 2

Figure 7:
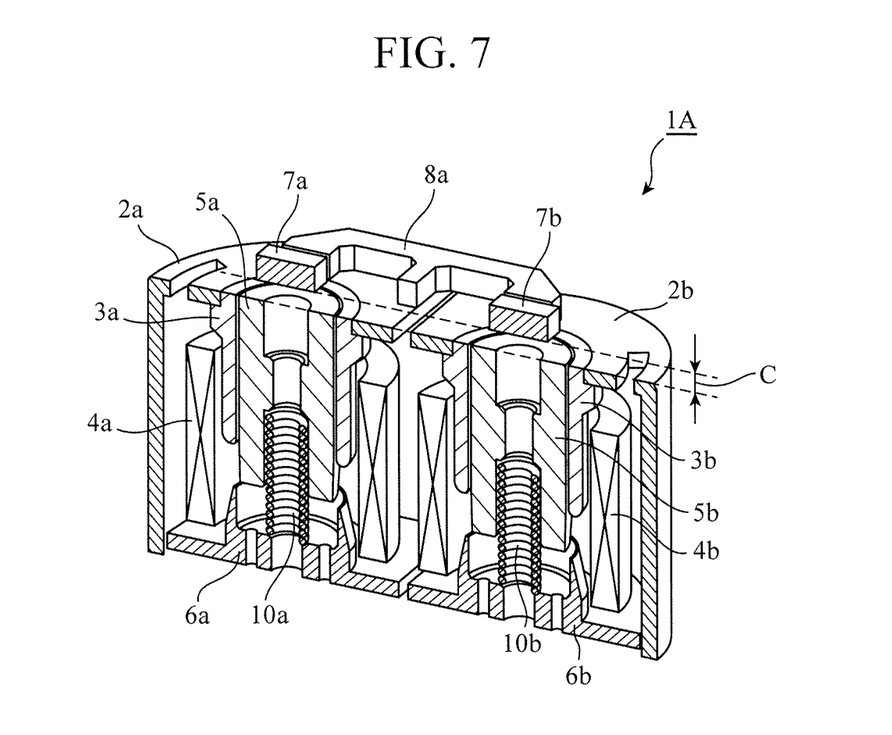
FIG. 7 is a cross-sectional perspective view showing an electromagnetic actuator according to Embodiment 2 of the present invention.

FIG. 7 is a cross-sectional perspective view showing an electromagnetic actuator 1A according to Embodiment 2 of the present invention, and shows a state in which the electromagnetic actuator 1A is taken along the same line as the line a-a of FIG. 1.

Figure 8A:
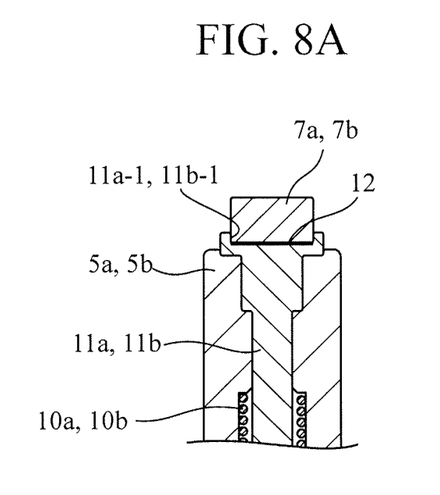
FIG. 8A is a cross-sectional view showing an example of a structure in which a sensor magnet is attached to an end of a shaft.
Figure 8B:
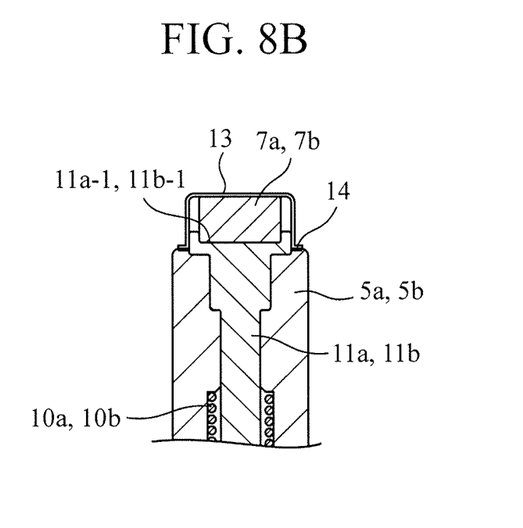
FIG. 8B is a cross-sectional view showing another example of the structure in which a sensor magnet is attached to an end of a shaft.

FIG. 8A is a cross-sectional view showing an example of a structure in which sensor magnets 7a and 7b are attached to ends of shafts 11a and 11b. Further, FIG. 8B is a cross-sectional view showing another example of the structure in which the sensor magnets 7a and 7b are attached to the ends of the shafts 11a and 11b.

In the electromagnetic actuator 1A, the sensor magnets 7a and 7b are attached on sides of plungers 5a and 5b, and move together with the plungers 5a and 5b.

Note that, as shown in FIG. 7, a magnetic gap C is disposed between the plungers 5a and 5b and the sensor magnets 7a and 7b.

This is because magnetic fluxes from the sensor magnets 7a and 7b are prevented from being short-circuited to the plungers 5a and 5b which are magnetic bodies.

As a structure in which the sensor magnets 7a and 7b are attached on sides of the plungers 5a and 5b while such a gap C is ensured, a structure as shown in FIG. 8A is provided, for example.

The shafts 11a and 11b are rod-shaped members which are fixed to the inner peripheries of the plungers 5a and 5b by inserting the members into the insides of the plungers, and are formed of nonmagnetic bodies. For example, the shafts 11a and 11b are press-fitted into inner peripheral holes of the plungers 5a and 5b, thereby being fixed.

Recessed portions 11a-1 and 11b-1 are formed in upper ends of the shafts 11a and 11b.

The sensor magnets 7a and 7b are fixed to the recessed portions 11a-1 and 11b-1 by using an adhesive 12.

Further, as the structure in which the sensor magnets 7a and 7b are attached on sides of the plungers 5a and 5b, a structure as shown in FIG. 8B can be provided. In this structure, after the sensor magnets 7a and 7b are arranged in recessed portions of the shafts 11a and 11b, they are covered by lids 13 which are nonmagnetic bodies. The lids 13 are fixed to upper ends of the plungers 5a and 5b by using welding 14.

Even though the structure is provided in this way, the sensor magnets 7a and 7b move integrally with the plungers 5a and 5b. Alternatively, by combining the structure of FIG. 8A and the structure of FIG. 8D, the lids 13 can be fixed by using an adhesive 12. Further, the recessed portions 11a-1 and 11b-1 can be formed independently of the shafts 11a and 11b as long as the recessed portions move integrally with the plungers 5a and 5b.

Figure 9:
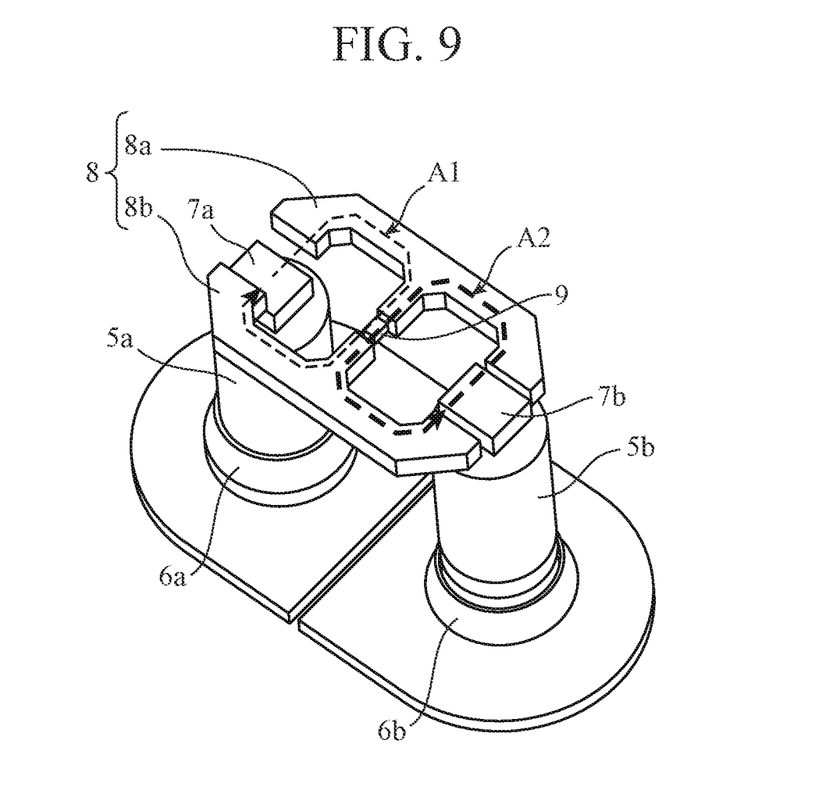
FIG. 9 is a perspective view showing a magnetic sensor circuit in the electromagnetic actuator according to Embodiment 2.

FIG. 9 is a perspective view showing a magnetic sensor circuit in the electromagnetic actuator 1A.

Figure 10:
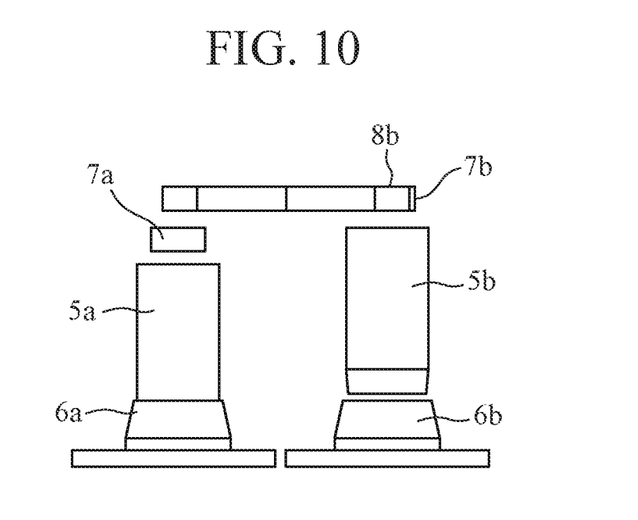
FIG. 10 is a side view showing a state in which sensor magnets move together with plungers.

Further, FIG. 10 is a side view showing a state in which the sensor magnets 7a and 7b move together with the plungers 5a and 5b. In FIGS. 9 and 10, an illustration of the components other than the magnetic sensor circuit, the plungers 5a and 5b, and bosses 6a and 6b is omitted. Further, it is assumed in these diagrams that the operating state of solenoid units is an ON/OFF state.

For example, when the plunger 5a is at a lower end position of a movable range thereof, the sensor magnet 7a has moved to a position lower than a position where an outer leg of a first sensor core unit 8a and an outer leg of a second sensor core unit 8b face each other, as shown in FIGS. 9 and 10. Therefore, the gap between the sensor magnet 7a and the sensor core 8 increases, and the amount of a magnetic flux of a magnetic circuit A1 is small.

On the other hand, because the plunger 5b is at an upper end position of a movable range thereof, the sensor magnet 7b is at a position where an outer leg of the first sensor core unit 8a and an outer leg of the second sensor core unit 8b face each other.

Therefore, the amount of a magnetic flux flowing through a magnetic circuit A2 is not small.

Figure 11:
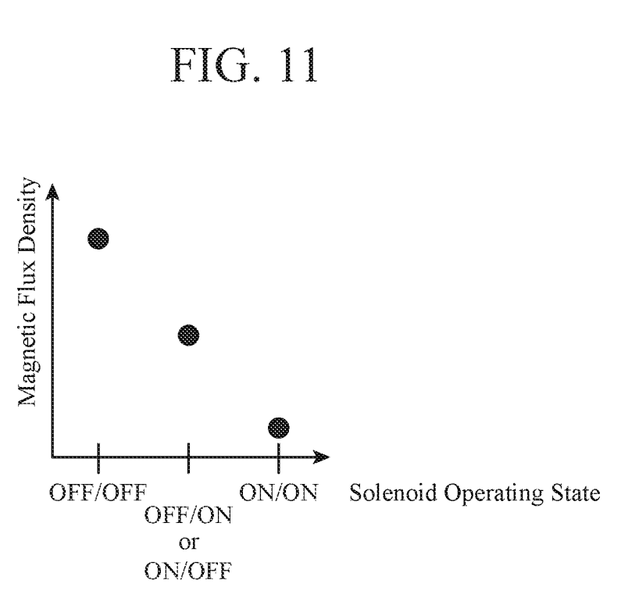
FIG. 11 is a graph showing a relation between the operating state of solenoid units in Embodiment 2, and a magnetic flux density at a point where a magnetic sensor exists.

FIG. 11 is a graph showing a relation between the operating state of the solenoid units in Embodiment 2, and a magnetic flux density at a point where a magnetic sensor 9 exists. When the operating state of the solenoid units is an OFF/OFF state, as shown in FIG. 11, both the sensor magnets 7a and 7b face the sensor core 8. Therefore, the magnetic flux density at the point where the magnetic sensor 9 exists has the highest value.

Then, in an OFF/ON or ON/OFF state, the magnetic flux density at the point where the magnetic sensor 9 exists has an intermediate value. In addition, in an ON/ON state, because both the sensor magnets 7a and 7b are apart from positions where the sensor magnets face the sensor core 8, the magnetic flux density at the point where the magnetic sensor 9 exists has the lowest value.

In this way, in the electromagnetic actuator 1A, the magnetic fluxes from the sensor magnets 7a and 7b change dependently on the positions of the plungers 5a and 5b. Therefore, by detecting the change in the magnetic flux density by using the magnetic sensor 9, the operating state of the solenoid units can be determined and thus the positions of the plungers 5a and 5b can be detected.

Although the case in which the number of solenoid units is two is shown above, the electromagnetic actuator 1A according to Embodiment 2 can be configured so as to include three or more solenoid units.

For example, the magnetic sensor circuit shown in FIG. 5 can be disposed for the electromagnetic actuator 1A including three solenoid units. In this case, sensor magnets 7a, 7b, and 7c are attached to the corresponding plungers of the three solenoid units.

Even though the structure is provided in this way, the magnetic fluxes from the sensor magnets 7a, 7b, and 7c change dependently on the operating state of the three solenoid units. Therefore, by detecting the change in the magnetic flux density by using the magnetic sensor 9, the operating state of the solenoid units can be determined and thus the positions of the plungers can be detected.

As mentioned above, in the electromagnetic actuator 1A according to Embodiment 2, the sensor magnets 7a and 7b are attached to opposite ends of the plungers 5a and 5b from the bosses 6a and 6b, and move together with the plungers 5a and 5b. Because the positions of the plungers can be detected by using the single magnetic sensor 9, like in the case of Embodiment 1, even though the structure is provided in this way, the number of parts can be reduced and upsizing can be suppressed.

Embodiment 3

Figure 12A:
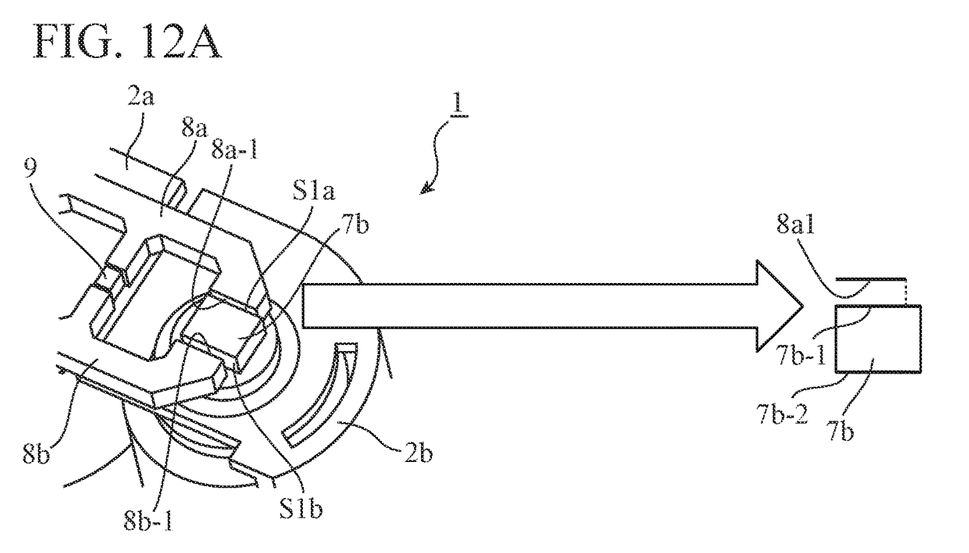
FIG. 12A is a diagram showing a relation of a sensor magnet and a sensor core in Embodiment 1.
Figure 12B:
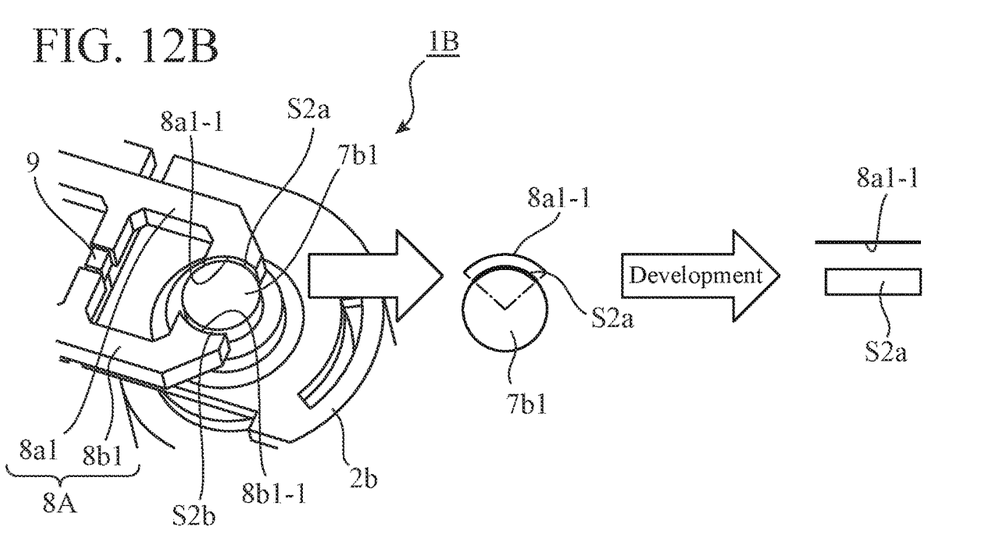
FIG. 12B is a diagram showing a relation of a sensor magnet and a sensor core in an electromagnetic actuator according to Embodiment 3 of the present invention.

FIG. 12P, is a diagram showing a relation between the sensor magnet 7b and the sensor core 8 in the electromagnetic actuator 1 according to Embodiment 1. Further, FIG. 12B is a diagram showing a relation between a sensor magnet 7b1 and a sensor core 8A in an electromagnetic actuator 1B according to Embodiment 3 of the present invention. Although only a structure on a side of the sensor magnet 7b1 is shown in FIG. 12B, for a sensor magnet 7a1 adjacent to this structure, the same structure is used.

In FIG. 12A, the sensor magnet 7b is a prismatic permanent magnet.

Further, a facing surface 8a-1 of an outer leg of a first sensor core unit 8a faces a facing surface S1a of the sensor magnet 7b, and a facing surface 8b-1 of an outer leg of a second sensor core unit 8b faces a facing surface S1b of the sensor magnet 7b.

A view on a right-hand side in FIG. 12A denoted by an arrow is a top view showing the facing surface 8a-1 and the sensor magnet 7b. As shown in this view, in the case in which the sensor magnet 7b has a prismatic shape, by using sides 7b-1 and 7b-2 of an end surface having this quadrangular shape, the positioning between the facing surfaces 8a-1 and 8b-1 of the sensor core 8 can be performed. As a result, it is possible to easily assemble the sensor magnet 7b and the sensor core 8. The same goes for a side of the sensor magnet 7a.

On the other hand, each of the sensor magnets 7a1 and 7b1 in the electromagnetic actuator 1B is a cylinder-shaped permanent magnet.

In FIG. 12B, a facing surface 8a1-1 of an outer leg of a first sensor core unit 8a1 faces a facing surface S2a of the sensor magnet 7b1, and a facing surface 8b1-1 of an outer leg of a second sensor core unit 8b1 faces a facing surface S2b of the sensor magnet 7b1.

Further, the facing surfaces 8a1-1 and 8b1-1 have curved surfaces extending along the outer periphery of the sensor magnet 7b1.

As shown in a central part of FIG. 12B, the facing surface 8a1-1 of the sensor core 8A faces the facing surface S2a which is an outer peripheral part of the sensor magnet 7b1. Further, a view on a right-hand side in FIG. 12B denoted by an arrow shows that the facing surface S2a of the sensor magnet 7b1 is developed in a width direction.

By forming each of the sensor magnets 7a1 and 7b1 to have a cylindrical shape, and causing the curved surfaces of the sensor core 8A and corresponding curved surfaces of the sensor magnets 7a1 and 7b1 to face each other, the facing area can be increased to be larger than that in the structure in which flat surfaces are made to face each other as shown in FIG. 12A.

In this way, as the facing area between the sensor core 8A and each of the sensor magnets 7a1 and 7b1 increases, the amount of a magnetic flux flowing through a magnetic sensor circuit increases, and the maximum of the magnetic flux density in the magnetic sensor 9 increases.

As long as each of the sensor magnets has a cylindrical shape, even though the facing surfaces of the sensor core are formed to be flat, the facing area can be increased to be larger than that in the structure in which the flat surfaces are made to face each other as shown in FIG. 12A.

Further, in the electromagnetic actuator in which a sensor magnet is attached to each plunger, even though each plunger is configured so as to move while rotating about an axis, a touch with the sensor core can be prevented as long as each of the sensor magnets has a cylindrical shape.

Further, the diameter with respect to an end surface of each of the sensor magnets 7a1 and 7b1 can be made to be larger than the width of the facing surface 8a1-1 of the first sensor core unit 8a1, and the width of the facing surface 8b1-1 of the second sensor core unit 8b1. By configuring in this way, because the facing area can be ensured even though the sensor magnet 7a1 and 7b1 rotate, a decrease in the magnetomotive force can be suppressed.

As mentioned above, each of the sensor magnets 7a1 and 7b1 in the electromagnetic actuator 1B according to Embodiment 3 has a cylindrical shape. By configuring in this way, the facing area between each of the sensor magnets and the sensor core can be increased. As a result, the amount of the magnetic flux flowing through the magnetic sensor circuit increases, and the maximum of the magnetic flux density in the magnetic sensor 9 can be increased.

In addition, in the electromagnetic actuator 1B according to Embodiment 3, the diameter L2 with respect to the end surface of each of the sensor magnets 7a1 and 7b1 is larger than the width L3 of each of the facing surfaces 8a1-1 and 8b1-1 of the sensor core 8A, each of the facing surfaces facing an outer peripheral part of one of the sensor magnets 7a1 and 7b1.

By configuring in this way, because the facing area can be ensured even though the sensor magnets 7a1 and 7b1 rotate, a decrease in the magnetomotive force can be suppressed.

Embodiment 4

Figure 13:
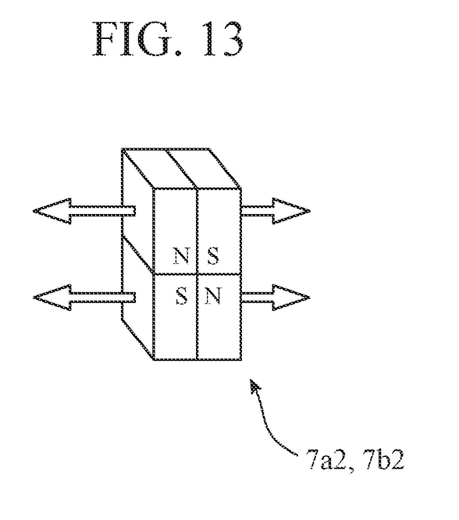
FIG. 13 is a perspective view showing sensor magnets of an electromagnetic actuator according to Embodiment 4 of the present invention.

FIG. 13 is a perspective view showing sensor magnets 7a2 and 7b2 of an electromagnetic actuator 1C according to Embodiment 4 of the present invention. Each of the sensor magnets 7a2 and 7b2 shown in FIG. 13 embodies a multipole magnet in the present invention, and has a structure in which two multipolar magnetized magnets or two bipolar magnetized magnets are alternately piled up. Further, the sensor magnet 7a2 and 7b2 are used while being attached to upper ends of plungers 5a and 5b, like those of Embodiment 2.

Figures 14A, 14B:
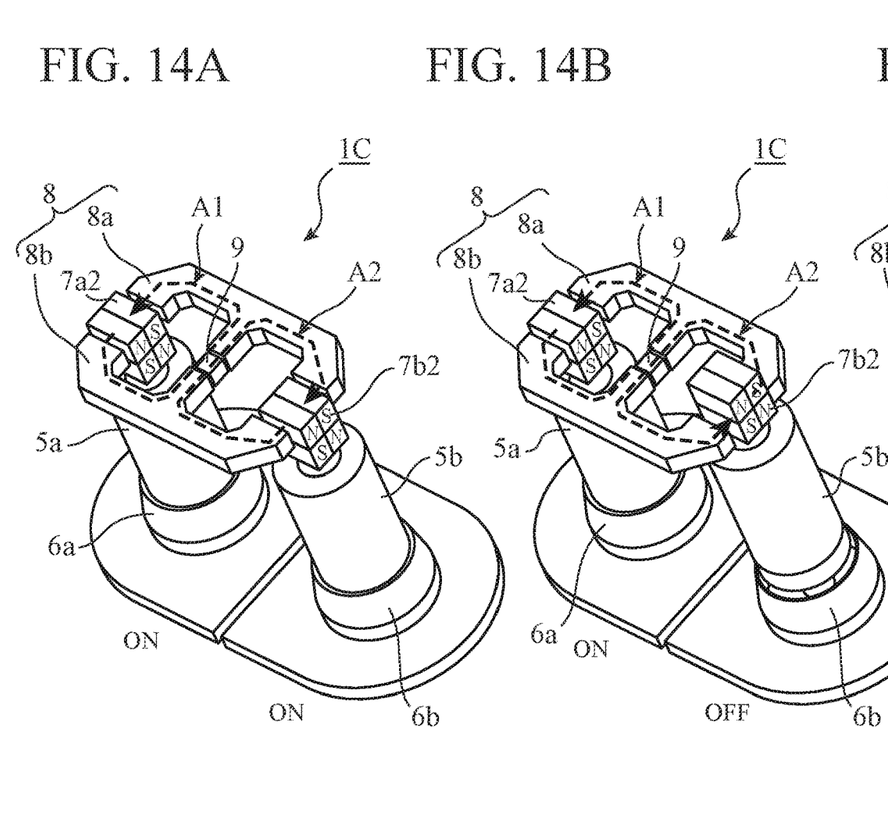
FIG. 14A is a perspective view showing a magnetic sensor circuit in Embodiment 4 (the operating state of solenoid units is ON/ON)
FIG. 14B is a perspective view showing the magnetic sensor circuit in Embodiment 4 (the operating state of the solenoid units is ON/OFF)
Figure 14C:
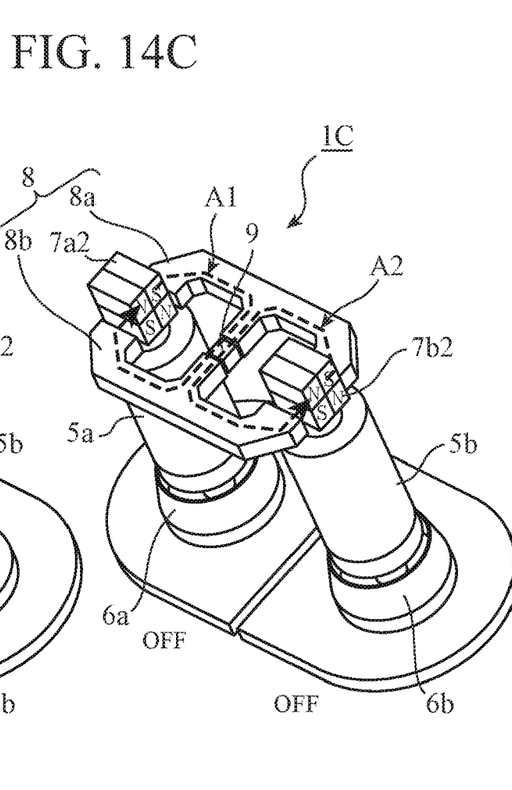
FIG. 14C is a perspective view showing the magnetic sensor circuit in Embodiment 4 (the operating state of the solenoid units is OFF/OFF)
Figure 15:
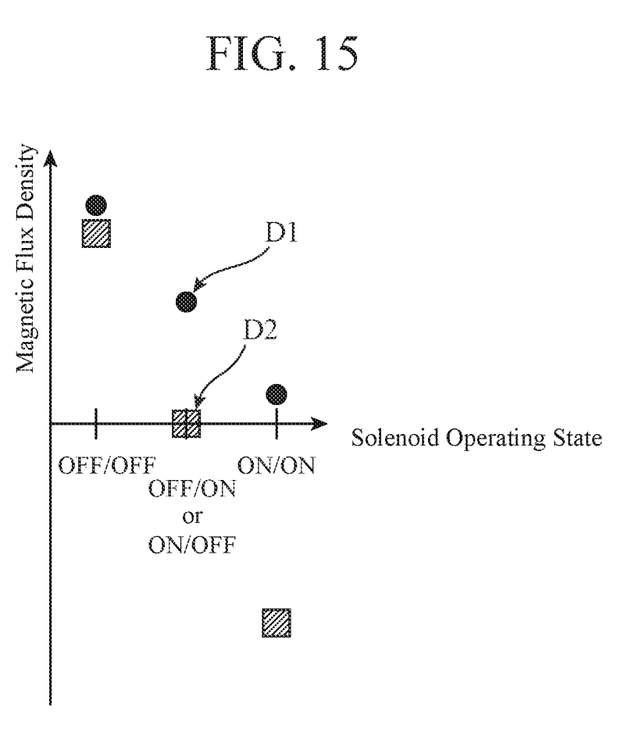
FIG. 15 is a graph showing a relation between the operating state of the solenoid units in Embodiment 4, and a magnetic flux density at a point where a magnetic sensor exists.

FIG. 14A is a perspective view showing a magnetic sensor circuit when the operating state of solenoid units is ON/ON. FIG. 14B is a perspective view showing the magnetic sensor circuit when the operating state of the solenoid units is ON/OFF. FIG. 14C is a view showing the magnetic sensor circuit when the operating state of the solenoid units is OFF/OFF. Further, FIG. 15 is a graph showing a relation between the operating state of the solenoid units in Embodiment 4, and a magnetic flux density at a point where a magnetic sensor 9 exists. In FIG. 15, a plot denoted by an arrow D1 shows a relation in the electromagnetic actuator 1A shown in FIG. 11, and a plot denoted by an arrow D2 shows a relation in the electromagnetic actuator 1C according to Embodiment 4.

In the electromagnetic actuator 1C, by using the sensor magnets 7a2 and 7b2 which are multipole magnets, the directions of the magnetic fluxes of a magnetic circuit A1 and a magnetic circuit A2 are changed dependently on the change in the positions of the plungers 5a and 5b. For example, a configuration is provided in which when the positions of the plungers 5a and 5b are the same, the directions of the magnetic fluxes flowing through the magnetic sensor 9 are the same between the magnetic circuit A1 and the magnetic circuit A2, whereas when the positions of the plungers 5a and 5b differ from each other, the directions of the magnetic fluxes are opposite between the magnetic circuit A1 and the magnetic circuit A2.

When the operating state of the solenoid units is ON/ON, the directions of the magnetic fluxes flowing through the magnetic sensor 9 are the same between the magnetic circuit A1 and the magnetic circuit A2, as shown in FIG. 14A. As a result, in the magnetic sensor 9, the magnetic fluxes from the sensor magnets 7a2 and 7b2 enhance each other. When the density of a magnetic flux in this direction is expressed as a negative value, the density of the magnetic flux flowing through the magnetic sensor 9 is the highest in a negative direction, as shown in FIG. 15.

Further, when the operating state of the solenoid units is OFF/ON or ON/OFF, the direction of the magnetic flux of one of the magnetic circuits A1 and A2 is reversed, as shown in FIG. 14B.

As a result, in the magnetic sensor 9, the magnetic fluxes from the sensor magnets 7a2 and 7b2 cancel each other out. Therefore, as shown in FIG. 15, the density of the magnetic flux flowing through the magnetic sensor 9 is zero.

In addition, when the operating state of the solenoid units is OFF/OFF, the directions of the magnetic fluxes flowing through the magnetic sensor 9 are the same between the magnetic circuit A1 and the magnetic circuit A2, as shown in FIG. 14C. As a result, in the magnetic sensor 9, the magnetic fluxes from the sensor magnets 7a2 and 7b2 enhance each other. When the density of a magnetic flux in this direction is expressed as a positive value, the density of the magnetic flux flowing through the magnetic sensor 9 is the highest in a positive direction, as shown in FIG. 15.

As can be seen from a comparison between the plot denoted by the arrow D1 and the plot denoted by the arrow D2 in FIG. 15, the difference in the magnetic flux density dependent on the operating state of the solenoid units is large in the electromagnetic actuator 1C according to Embodiment 4. As a result, the influence of an external noise can be reduced.

Although the case in which the number of solenoid units is two is shown above, the electromagnetic actuator 1C according to Embodiment 4 can be configured so as to include three or more solenoid units.

For example, a magnetic sensor circuit shown in FIG. 5 can be provided for the electromagnetic actuator 1C including three solenoid units. In this case, sensor magnets 7a, 7b, and 7c are multipole magnets. Even though the structure is provided in this way, the magnetic fluxes from the sensor magnets 7a, 7b, and 7c change dependently on the operating state of the three solenoid units. Therefore, by detecting the change in the magnetic flux density by using the magnetic sensor 9, the operating state of the solenoid units can be determined and thus the positions of the plungers can be detected.

As mentioned above, the sensor magnets 7a2 and 7b2 in the electromagnetic actuator 1C according to Embodiment 4 are multipole magnets, and the directions of the magnetic fluxes flowing through the sensor core 8 change by the multipole magnets moving together with the plungers 5a and 5b. Even though the structure is provided in this way, the same advantage as that of Embodiment 2 can be provided. Further, because the difference in the magnetic flux density dependent on the positions of the sensor magnets 7a2 and 7b2 is large, the influence of an external noise can be reduced.

It is to be understood that any combination of two or more of the above-mentioned embodiments can be made, various changes can be made in any component according to each of the above-mentioned embodiments, and any component according to each of the above-mentioned embodiments can be omitted within the scope of the invention.

INDUSTRIAL APPLICABILITY

Because the electromagnetic actuator according to the present invention can reduce the number of parts and achieve downsizing even though the electromagnetic actuator includes multiple plungers, the electromagnetic actuator is suitable for, for example, a cam switching system that adjusts the amount of valve lift of an internal combustion engine.

REFERENCE SIGNS LIST 1, 1A to 1C electromagnetic actuator, 2a, 2b case, 3a, 3b core, 4a, 4b coil, 5a, 5b plunger, 6a, 6b boss, 7a, 7a1, 7a2, 7b, 7b1, 7b2 sensor magnet, 7b-1, 7b-2 side, 8, 8A sensor core, 8a, 8a1, 8a2, 8A1 first sensor core unit, 8a-1, 8a1-1, 8b-1, 8b1-1 facing surface, 8b, 8b1, 8b2, 8B1 second sensor core unit, 9 magnetic sensor, 10a, 10b spring, 11a, 11b shaft, 11a-1, 11b-1 recessed portion, 12 adhesive, 13 lid, and 14 welding.

The invention claimed is:
1. An electromagnetic actuator comprising:
multiple solenoid units each including: a case which is a magnetic body; a core provided in the case, the core being a magnetic body; a boss provided for the case and facing the core in an axis direction of the core, the boss being a magnetic body; a coil provided around an outer periphery of the core; and a plunger provided along an inner periphery of the core and to move by receiving a magnetic attraction force in the axis direction, the magnetic attraction force acting between the plunger and the boss by a magnetic flux generated by passage of a current through the coil; and
a magnetic sensor circuit including: a sensor magnet provided for each of the solenoid units; a sensor core through which a magnetic flux of the sensor magnet flows, the sensor core being a magnetic body; and a single magnetic sensor to detect a magnetic flux flowing through the sensor core and changing dependently on a position of the plunger,
wherein the sensor core is arranged in a plane which is positioned on a side of an opposite end of the plunger from the boss and which is perpendicular to a direction of movement of the plunger, and the magnetic sensor is arranged at a position in the plane, the position being apart from a magnetic path of a leakage flux which is generated by the passage of a current through the coil and flows through the sensor core.

2. The electromagnetic actuator according to claim 1, wherein the sensor magnet is fixed to the sensor core on the side of the opposite end of the plunger from the boss.

3. The electromagnetic actuator according to claim 1, wherein the sensor magnet is attached to the opposite end of the plunger from the boss, and moves together with the plunger.

4. The electromagnetic actuator according to claim 2, wherein the sensor magnet has a cylindrical shape.

5. The electromagnetic actuator according to claim 2, wherein the sensor magnet has a prismatic shape.

6. The electromagnetic actuator according to claim 4, wherein a diameter with respect to an end surface of the sensor magnet is larger than a width of a surface of the sensor core, the surface facing an outer peripheral part of the sensor magnet.

7. The electromagnetic actuator according to claim 1, wherein the sensor core includes:
   a first sensor core unit having three or more legs; and
   a second sensor core unit having three or more legs and arranged with respect to the first sensor core unit in such a way that one leg out of the three or more legs of the first sensor core unit and one leg out of the three or more legs of the second sensor core unit are made to face each other with the magnetic sensor being sandwiched between the legs facing each other, and a remaining leg out of the legs of the first sensor core unit and a remaining leg out of the legs of the second sensor core unit are made to face each other with the sensor magnet being sandwiched between the remaining legs facing each other.

8. The electromagnetic actuator according to claim 7, wherein a facing area between the legs facing each other is smaller than that between outer the remaining legs facing each other.

9. The electromagnetic actuator according to claim 7, wherein the sensor core is formed of a laminated steel plate.

10. The electromagnetic actuator according to claim 3, wherein the sensor magnet has a cylindrical shape.

11. The electromagnetic actuator according to claim 3, wherein the sensor magnet has a prismatic shape.

12. The electromagnetic actuator according to claim 3, wherein the sensor magnet is a multipole magnet, and a direction of a magnetic flux flowing through the sensor core changes by the multipole magnet moving together with the plunger.

* * * * *